United States Patent
Giri et al.

(10) Patent No.: US 12,531,067 B1
(45) Date of Patent: Jan. 20, 2026

(54) SEMI-SUPERVISED TRAINING OF A MACHINE LEARNING MODEL FOR TARGET SPEAKER AUDIO ENHANCEMENT

(71) Applicant: Amazon Technologies, Inc., Seattle, WA (US)

(72) Inventors: Ritwik Giri, Mountain View, CA (US); Michael Mark Goodwin, Scotts Valley, CA (US); Arvindh Krishnaswamy, Palo Alto, CA (US); Mehmet Umut Isik, White Plains, NY (US); Jean-Marc Valin, Montreal (CA); Zhepei Wang, Champaign, IL (US); Shrikant Venkataramani, Champaign, IL (US); Paris Smaragdis, Urbana, IL (US)

(73) Assignee: Amazon Technologies, Inc., Seattle, WA (US)

( * ) Notice: Subject to any disclaimer, the term of this patent is extended or adjusted under 35 U.S.C. 154(b) by 766 days.

(21) Appl. No.: 17/809,746

(22) Filed: Jun. 29, 2022

(51) Int. Cl.
| | |
|---|---|
| G10L 17/04 | (2013.01) |
| G10L 17/02 | (2013.01) |
| G10L 17/06 | (2013.01) |

(52) U.S. Cl.
CPC .............. *G10L 17/04* (2013.01); *G10L 17/02* (2013.01); *G10L 17/06* (2013.01)

(58) Field of Classification Search
CPC .......... G10L 17/04; G10L 17/02; G10L 17/06
USPC ........................................................ 704/243
See application file for complete search history.

(56) References Cited

U.S. PATENT DOCUMENTS

| | | | | |
|---|---|---|---|---|
| 10,991,379 | B2 * | 4/2021 | Hijazi | G10L 15/25 |
| 11,527,092 | B1 * | 12/2022 | Farber | G06N 3/088 |
| 11,688,198 | B1 * | 6/2023 | Ranjan | G06F 18/213 |
| | | | | 382/115 |
| 12,086,225 | B1 * | 9/2024 | Medioni | G06F 18/2131 |
| 2003/0182119 | A1 * | 9/2003 | Junqua | G10L 15/24 |
| | | | | 704/E15.041 |
| 2018/0115824 | A1 * | 4/2018 | Cassidy | H04R 3/007 |
| 2019/0201657 | A1 * | 7/2019 | Popelka | A61N 1/36038 |

(Continued)

FOREIGN PATENT DOCUMENTS

| | | | | | |
|---|---|---|---|---|---|
| CA | | 3036533 C | * | 4/2020 | ............. G06N 3/04 |
| CA | | 3221042 A1 | * | 12/2022 | ............. G06F 21/32 |

(Continued)

OTHER PUBLICATIONS

Zhepei Wang et al, "Semi-Supervised Time Domain Target Speaker Extraction with Attention", pp. 1-5.

(Continued)

*Primary Examiner* — Edwin S Leland, III
(74) *Attorney, Agent, or Firm* — S. Scott Foster; Kowert, Hood, Munyon, Rankin & Goetzel, P.C.

(57) ABSTRACT

Training a machine learning model for application to an audio enhancement system for a target speaker may be performed. When at least one clean audio speech sample of a target speaker is captured, the machine learning model may then be trained using noisy audio speech samples in which the voice of the target speaker is present in addition to the voices of other speakers and/or background noise. Once the machine learning model is sufficiently trained, it may be deployed for use in audio enhancement and voice processing for an audio transmission service.

20 Claims, 9 Drawing Sheets

Training workflow
110

Speaker embedding for User A
106

Training audio data sample A
112

→ target speaker voice extraction 114 → Estimated output audio for User A 116 → target speaker embedding generation 118 →

Speaker embedding for User A
106

Estimated output speaker embedding for User A
120

→ Voice representation loss function evaluation 122

(56) References Cited

U.S. PATENT DOCUMENTS

| | | | | |
|---|---|---|---|---|
| 2019/0318755 | A1* | 10/2019 | Tashev | G06N 3/045 |
| 2020/0066296 | A1* | 2/2020 | Sargsyan | G10L 21/0232 |
| 2020/0075148 | A1* | 3/2020 | Nguyen | G16H 20/10 |
| 2020/0152179 | A1* | 5/2020 | van Hout | G10L 15/22 |
| 2020/0335122 | A1* | 10/2020 | Meng | G06N 20/00 |
| 2021/0110813 | A1* | 4/2021 | Khoury | G10L 15/063 |
| 2021/0125625 | A1* | 4/2021 | Huang | G10L 25/21 |
| 2021/0233541 | A1* | 7/2021 | Chen | G10L 17/02 |
| 2021/0241776 | A1* | 8/2021 | Sivaraman | G10L 17/04 |
| 2021/0319804 | A1* | 10/2021 | Whitehill | G06N 3/044 |
| 2021/0383538 | A1* | 12/2021 | Deasy | G06T 3/4053 |
| 2022/0044687 | A1* | 2/2022 | Perret | G06N 3/045 |
| 2022/0121868 | A1* | 4/2022 | Chen | G10L 17/22 |
| 2022/0122597 | A1* | 4/2022 | Ji | G10L 21/0232 |
| 2022/0335953 | A1* | 10/2022 | Rikhye | G10L 17/06 |
| 2023/0419984 | A1* | 12/2023 | Uhle | G10L 25/48 |

FOREIGN PATENT DOCUMENTS

| | | | | |
|---|---|---|---|---|
| CN | 106098068 | A  * | 11/2016 | G10L 17/08 |
| CN | 107924682 | A  * | 4/2018 | G07C 9/37 |
| CN | 111341326 | A  * | 6/2020 | G06N 3/0454 |
| CN | 111462739 | A  * | 7/2020 | G06F 21/32 |
| CN | 112331216 | A  * | 2/2021 | |
| CN | 112435673 | A  * | 3/2021 | G10L 17/02 |
| CN | 113221673 | A  * | 8/2021 | G06F 18/214 |
| CN | 113299295 | A  * | 8/2021 | G10L 17/04 |
| CN | 113823293 | A  * | 12/2021 | G10L 17/02 |
| CN | 114093357 | A  * | 2/2022 | |
| CN | 114245204 | A  * | 3/2022 | G06Q 40/03 |
| CN | 114613369 | A  * | 6/2022 | G10L 17/02 |
| CN | 114822548 | A  * | 7/2022 | |
| CN | 114822559 | A  * | 7/2022 | |
| CN | 115083420 | A  * | 9/2022 | |
| CN | 113241081 | B  * | 6/2023 | G10L 17/02 |
| CN | 113705671 | B  * | 8/2023 | |
| CN | 117012205 | A  * | 11/2023 | G10L 17/04 |
| CN | 117292689 | A  * | 12/2023 | |
| CN | 114255782 | B  * | 8/2024 | G10L 21/0232 |
| DE | 112016004008 | T5 * | 5/2018 | G07C 9/37 |
| EP | 3644311 | A1 * | 4/2020 | G06N 20/10 |
| KR | 20170131585 | A  * | 11/2017 | |
| KR | 101995547 | B1 * | 7/2019 | |
| KR | 20190079692 | A  * | 7/2019 | |
| KR | 102026396 | B1 * | 9/2019 | |
| KR | 20220137921 | A  * | 2/2021 | |
| WO | WO-2022113218 | A1 * | 6/2022 | G10L 17/06 |

OTHER PUBLICATIONS

U.S. Appl. No. 17/037,498, filed Sep. 29, 2020, Jean-Marc Valin.

U.S. Appl. No. 17/037,515, filed Sep. 29, 2020, Mehmet Umut Isik.

U.S. Appl. No. 17/364,805, filed Jun. 30, 2021, Ritwik Giri.

V. Panayotov, G. Chen, D. Povey, and S. Khudanpur, "Librispeech: An ASR Corpus Based on Public Domain Audio Books," in IEEE International Conference on Acoustics, Speech and Signal Processing (ICASSP), 2015, pp. 1-5.

D. P. Kingma and J. Ba, "Adam: A method for stochastic optimization," Published as a conference paper at ICLR 2015, arXiv:1412.6980v9, pp. 1-15.

S. Mun, S. Choe, J. Huh, and J. S. Chung, "The sound of my voice: Speaker representation loss for target voice separation," IEEE International Conference on Acoustics, Speech and Signal Processing (ICASSP), 2020, arXiv:1911.02411v2, pp. 1-5.

J. Ba, J. R. Kiros, and G. E. Hinton, "Layer normalization," ArXiv, vol. abs/1607.06450, 2016, arXiv:1607.06450v1, pp. 1-14.

Q. Wang, H. Muckenhirn, K. Wilson, P. Sridhar, Z. Wu, J. R. Hershey, R. A. Saurous, R. J. Weiss, Y. Jia, and I. L. Moreno, "VoiceFilter: Targeted Voice Separation by Speaker-Conditioned Spectrogram Masking," in Interspeech, 2019, arXiv:1810.04826v6, pp. 1-5.

K. Zmolikova, et al., "Speakerbeam: Speaker aware neural network for target speaker extraction in speech mixtures," IEEE Journal of Selected Topics in Signal Processing, vol. 13, No. 4, 2019, pp. 800-814.

J. R. Hershey, Z. Chen, J. L. Roux, and S. Watanabe, "Deep clustering: Discriminative embeddings for segmentation and separation," IEEE International Conference on Acoustics, Speech and Signal Processing (ICASSP), 2016, pp. 1-5.

D. Yu, M. Kolbæk, Z. Tan, and J. H. Jensen, "Permutation invariant training of deep models for speaker-independent multi-talker speech separation," IEEE International Conference on Acoustics, Speech and Signal Processing (ICASSP), 2017, arXiv:1607.00325v2 pp. 1-5.

Q. Wang, I. L. Moreno, M. Saglam, K. Wilson, A. Chiao, R. Liu, Y. He, W. Li, J. Pelecanos, M. Nika, and A. Gruenstein, "VoiceFilter-Lite: Streaming Targeted Voice Separation for OnDevice Speech Recognition," in Interspeech, 2020. arXiv:2009.04323v1, pp. 1-5.

C. Xu, W. Rao, C. E. Siong, and H. Li, "Optimization of speaker extraction neural network with magnitude and temporal spectrum approximation loss," IEEE International Conference on Acoustics, Speech and Signal Processing (ICASSP), 2019, arXiv:1903.09952v1, pp. 1-5.

R. Giri, S. Venkataramani, J.-M. Valin, U. Isik, and A. Krishnaswamy, "Personalized PercepNet: Real-time, Low-complexity Target Voice Separation and Enhancement," Interspeech, 2021, arXiv:2106.04129v1, pp. 1-5.

Y. Luo and N. Mesgarani, "Conv-TasNet: Surpassing Ideal Time-Frequency Magnitude Masking for Speech Separation," IEEE/ACM Transactions on Audio, Speech, and Language Processing (TASLP), vol. 27, 2019, pp. 1-12.

A. Nagrani, J. S. Chung, and A. Zisserman, "Voxceleb: A large-scale speaker identification dataset," in Interspeech, 2017, pp. 1-6.

M. Delcroix, et al., "Improving speaker discrimination of target speech extraction with time-domain speakerbeam," EEE International Conference on Acoustics, Speech and Signal Processing (ICASSP), 2020, arxiv.org/abs/2001.08378v1, pp. 1-5.

A. Rix, J. Beerends, M. Hollier, and A. Hekstra, "Perceptual evaluation of speech quality (pesq)—a new method for speech quality assessment of telephone networks and codecs," in IEEE International Conference on Acoustics, Speech, and Signal Processing (ICASSP), vol. 2, 2001, pp. 1-4.

J. Zhao, S. Gao, and T. Shinozaki, "Time-Domain Target-Speaker Speech Separation with Waveform-Based Speaker Embedding," in Interspeech, 2020 ISCA, pp. 1436-1440.

C. Xu, W. Rao, E. S. Chng, and H. Li, "Spex: Multi-scale time domain speaker extraction network," IEEE/ACM Transactions on Audio, Speech, and Language Processing (TASLP), vol. 28, 2020, pp. 1370-1384.

M. Ge, C. Xu, L. Wang, C. E. Siong, J. Dang, and H. Li, "SpEx+: A Complete Time Domain Speaker Extraction Network," in Interspeech, 2020, arxiv.org/abs/2005.04686, pp. 1-5.

Meng Ge, et al., "Multi-Stage Speaker Extraction with Utterance and Frame-Level Reference Signals," IEEE International Conference on Acoustics, Speech and Signal Processing (ICASSP), 2021, arXiv:2011.09624v2, pp. 1-5.

C. Subakan, M. Ravanelli, S. Cornell, M. Bronzi, and J. Zhong, "Attention is all you need in speech separationAttention is All You Need in Speech Separation," IEEE International Conference on Acoustics, Speech and Signal Processing (ICASSP), 2021, arxiv.org/abs/2010.13154. pp. 1-5.

A. Vaswani, N. Shazeer, N. Parmar, J. Uszkoreit, L. Jones, A. N. Gomez, L. u. Kaiser, and I. Polosukhin, "Attention is all you need," in Neural Information Processing Systems (NeurIPS), vol. 30, 2017, pp. 1-11.

S. Wisdom, E. Tzinis, H. Erdogan, R. Weiss, K. Wilson, and J. Hershey, "Unsupervised sound separation using mixture in variant training," 34th in Neural Information Processing Systems (NeurIPS), vol. 33, 2020, pp. 1-12.

Z. Wang, R. Giri, U. Isik, J.-M. Valin, and A. Krishnaswamy, "Semi-supervised singing voice separation with noisy self-training," IEEE International Conference on Acoustics, Speech and Signal Processing (ICASSP), 2021, arXiv:2102.07961v1, pp. 1-5.

S. Yuan, Z. Wang, U. Isik, R. Giri, J.M. Valin, M. Goodwin, and A. Krishnaswamy, "Improved singing voice separation with chromagram-

(56) References Cited

OTHER PUBLICATIONS based pitch-aware remixing," IEEE International Conference on Acoustics, Speech and Signal Processing (ICASSP), 2022, arXiv:2203.15092v1, pp. 1-5.
E. Tzinis, Y. Adi, V. K. Ithapu, B. Xu, and A. Kumar, "Continual self-training with bootstrapped remixing for speech enhancement," IEEE International Conference on Acoustics, Speech and Signal Processing (ICASSP), 2022, arXiv:2110.10103v2, pp. 1-5.
A. Sivaraman, S. Kim, and M. Kim, "Personalized speech enhancement through self-supervised data augmentation and purification," in Interspeech, 2021, arXiv:2104.02018v1, pp. 1-5.
J. L. Roux, S. Wisdom, H. Erdogan, and J. R. Hershey, "Sdr-half-baked or well done?" IEEE International Conference on Acoustics, Speech and Signal Processing (ICASSP), 2019, arXiv:1811.02508v1, pp. 1-5.
L. Wan, Q. Wang, A. Papir, and I. Lopez-Moreno, "Generalized end-to-end loss for speaker verification," IEEE International Conference on Acoustics, Speech and Signal Processing (ICASSP), 2018, pp. 1-5.
Y. Luo, Z. Chen, and T. Yoshioka, "Dual-path rnn: Efficient long sequence modeling for time-domain single-channel speech separation," IEEE International Conference on Acoustics, Speech and Signal Processing (ICASSP), 2020, arXiv:1910.06379v2, pp. 1-5.
C. Xu, W. Rao, C. E. Siong, and H. Li, "Time-domain speaker extraction network," IEEE Automatic Speech Recognition and Understanding Workshop (ASRU), 2020, arXiv:2004.14762v1, pp. 1-8.

\* cited by examiner

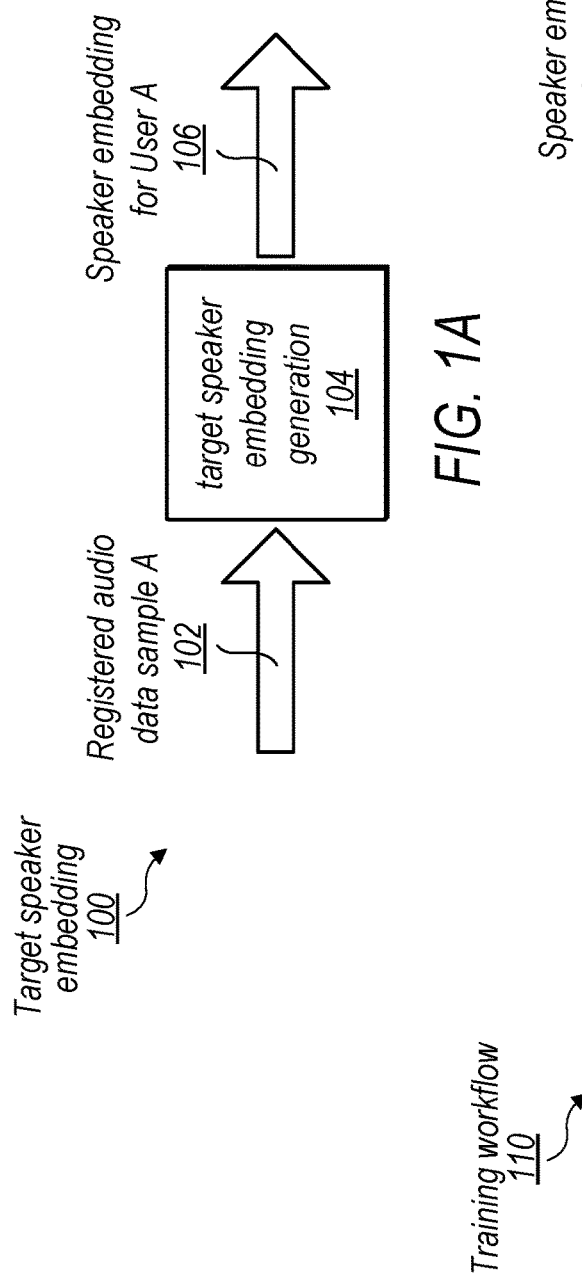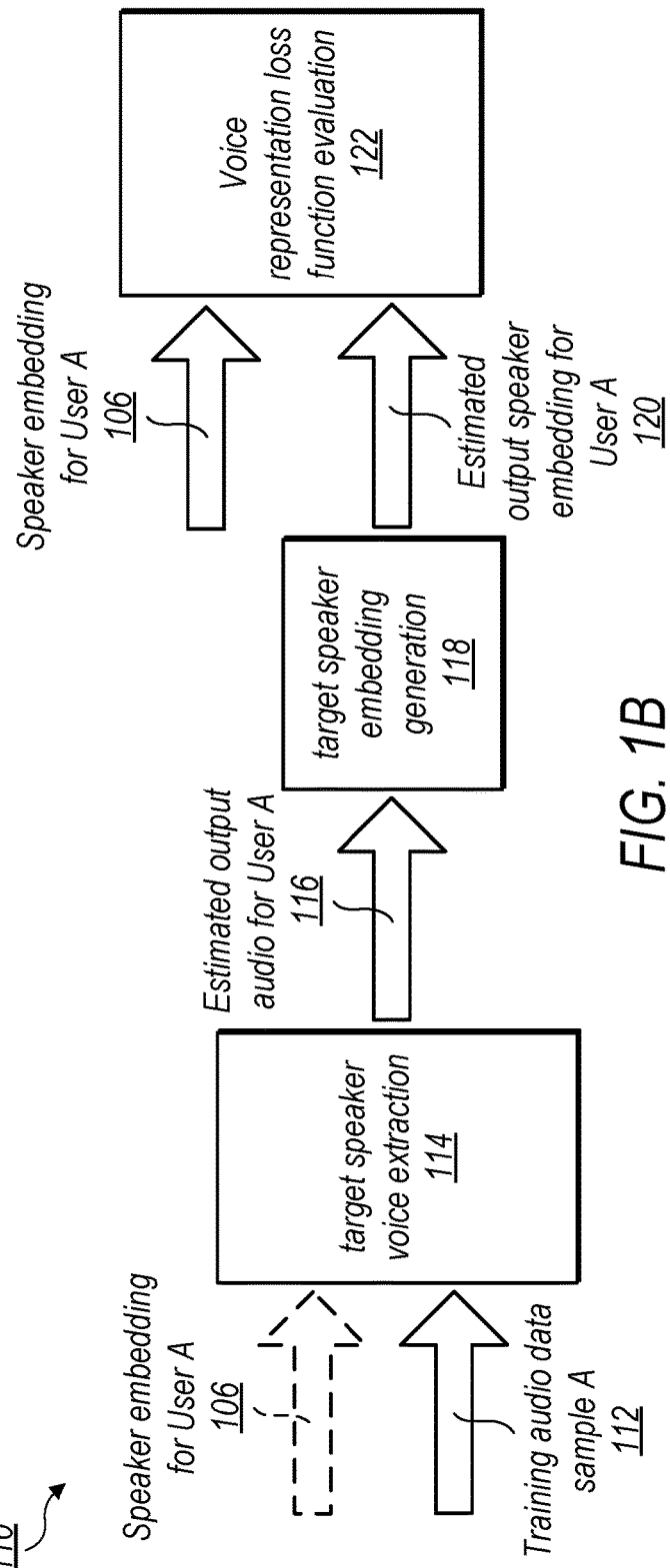

| Audio sample: | Metadata 140 |
|---|---|
| | Speakers identified in the sample: |
| Registered audio data sample A | User A |
| Registered audio data sample B | User A, background noise |
| Registered audio data sample C | User B |
| Training audio data sample A | User A, unidentified user(s), background noise |
| Training audio data sample B | User B, unidentified user(s), background noise |
| Training audio data sample C | User A, User B, background noise |
| ... | ... |

FIG. 1D

SEMI-SUPERVISED TRAINING OF A MACHINE LEARNING MODEL FOR TARGET SPEAKER AUDIO ENHANCEMENT

BACKGROUND

Over the past few years, audio enhancement methods (e.g., for recorded human speech) based on deep learning have greatly surpassed traditional methods based on spectral subtraction and spectral estimation. Many approaches for target speaker extraction may require a vast amount of labeled audio data (e.g., audio data that has metadata associated to it, including a description of features within the audio data, identified speakers that are speaking in the audio data, etc.) in order to train a machine learning model for such audio enhancement methods.

BRIEF DESCRIPTION OF THE DRAWINGS

FIG. 1A illustrates a logical block diagram of generating a target speaker embedding, according to some embodiments.

FIG. 1B illustrates a logical block diagram of an example training workflow for training a machine learning model for voice processing of an audio enhancement system, according to some embodiments.

FIG. 1D illustrates an example of metadata for a speaker registry of an audio enhancement system, according to some embodiments.

Figure 1C:
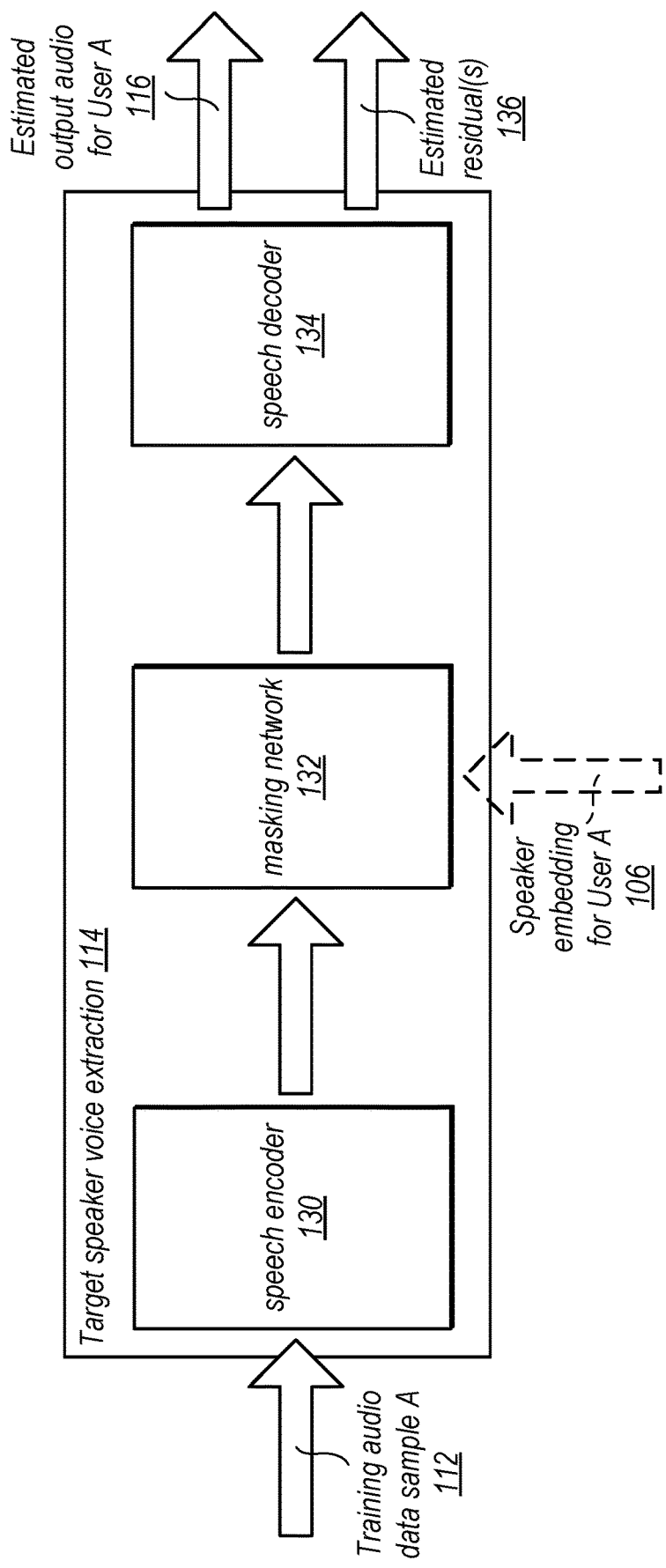
FIG. 1C illustrates a logical block diagram of an example target speaker voice extraction model for training a machine learning model for voice processing of an audio enhancement system, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for training a machine learning model for application to a target speaker audio enhancement system are described herein. In some embodiments, a target speaker may refer to a person that has been identified by the audio enhancement system and whose voice should be enhanced. The speech signal of the target speaker may be enhanced (e.g., conditioned) such that other signals (e.g., other speakers, background noise, stochastic interference, etc.) are filtered, diminished, suppressed, or otherwise minimized using the methods and techniques described herein.

Real-world communications may take place in complex auditory scenes in which the speech of a target speaker may be contaminated by additional interfering speakers and/or background noise. To improve the quality of speech of the target speaker, machine learning models, such as deep learning methods, have been developed for target speaker extraction, also known as personalized speech enhancement. As opposed to blind source separation systems in which all individual sources are separated by the model, target speaker extraction systems may isolate the speech signal of the target speaker from other speakers and ambiance noise. By focusing on the target speaker and treating the rest of the signal as interference, target speaker extraction systems may not require the information of the total number of sources beforehand and may not suffer from the permutation ambiguity, which are two primary challenges in blind source separation systems.

Despite this progress in performance, previous target speaker extraction systems usually still required large amounts of "labeled" audio data samples (e.g., clean audio data samples in which only a target speaker is present in the speech signal without interfering signal(s), and/or audio data samples in which the source components of the audio signal are known) in order to train machine learning models for the respective target speaker extraction systems. These large amounts of "labeled" audio data samples not only may be difficult to obtain, but also may not provide enough variety in terms of target speakers (e.g., different dialects, accents, languages, etc.) in order to train a robust machine learning model, according to some embodiments.

In order to help overcome these limitations, methods and techniques for training machine learning models for target speaker extraction using both "labeled" audio data samples and "noisy" audio data samples (see the following paragraphs for further explanation) are described herein. As "noisy" audio data samples may be easier to collect in large amounts for training purposes since such samples resemble real-world acoustic conditions. In some of the embodiments described herein, training the machine learning models for target speaker extraction using both "labeled" and "noisy" audio data samples may include both supervised and semi-supervised training methods. The following paragraphs elaborate on the types of audio data samples that are applied to such training methods, with regards to the embodiments described herein, and on such supervised and semi-supervised training methods.

In some embodiments, an audio data sample may be referred to as a clean audio data sample if there is only one speaker present in the audio signal and there are no interfering signals (e.g., from other speakers, etc.). In some of the embodiments described herein, clean audio data samples may be referred to as registered audio data samples.

In some embodiments, an audio data sample may be referred to as an audio data sample mixture when there is at least one additional audio signal of another speaker in addition to the audio signal of the target speaker (e.g., a target speaker and one or more additional speakers, in addition to possible background noise). The audio data sample mixture may be "labeled" if the source components of the mixture are known (e.g., the target speaker level has been separated from interfering signals). In addition, registered audio data samples may be synthetically mixed together to create a "labeled" audio data sample mixture, according to some embodiments. In such embodiments of a synthetic mixture of registered audio data samples, the source components of the mixture are known. With regard to the embodiments described herein, training a machine learning model via registered audio data samples in combination with "labeled" audio data sample mixtures during a given stage of training may be referred to as supervised training.

In some embodiments, an audio data sample mixture may not be considered as "labeled" if the source components of the mixture are not known. For example, in a given audio data sample mixture, it may be known that an audio signal of a given speaker makes up some unknown part of the overall audio signal mixture (e.g., the given speaker speaks at least sometime during the given audio data sample mixture), but the source component representing the audio signal of the given speaker may not have been determined. In some of the embodiments described herein, such examples in which an audio data sample mixture may not be considered as "labeled" may be referred to as training audio data samples and/or "noisy" audio data samples. With regard to the embodiments described herein, training a machine learning model via registered audio data samples in combination with training audio data samples during a given stage of training may be referred to as semi-supervised training.

Given audio data samples may be considered "noisy" when an audio signal is captured in a noisy environment. For example, in a scenario in which an audio signal is captured by an audio sensor (e.g., hands-free microphone) in a noisy environment, the total audio signal, y(n), in the time domain may be written as $$y(n) = x(n) * h(n) + \eta(n),$$

wherein the clean speech audio of the target speaker, x(n), is convoluted with the impulse response from the target speaker into the microphone, h(n), and added to additive noise from the room, η(n).

In some embodiments, target speaker extraction models, such as those described herein, aim to use machine learning to learn a target speaker's voice such that it may be identified and enhanced (e.g., enhanced while additional speakers and/or background noise is suppressed) in subsequent audio data samples. In order to learn a target speaker's voice, a registered audio data sample associated to the target speaker, such as one of the registered audio data samples described above, may be used to generate a high-dimensional embedding vector (see the description of FIG. 1A herein). Then, the embedding vector may be used as a type of control input to configure the target speaker extraction model to enhance target speaker's voice in subsequent training audio data samples and/or "labeled" audio data sample mixtures that are also identified as being associated to the same target speaker (see the description of FIG. 1B herein). In some embodiments, the target speaker extraction model may be first trained using "labeled" audio data sample mixtures during a supervised training stage, and next trained using training audio data samples during a semi-supervised training stage. The target speaker extraction model may be considered as "pre-trained" after these two stages, and may then be deployed for use by an audio transmission service, according to some embodiments. In some embodiments, the target speaker extraction model may continue to refine training using the machine learning model after an initial deployment (e.g., in an "online" learning setting).

This specification begins with a general description of a semi-supervised training workflow of a machine learning model for voice processing for a target speaker audio enhancement system. Various examples of, including different components/modules, or arrangements of components/modules that may be employed as part of implementing the training workflow. Next, a provider network that implements multiple different services, including an audio transmission service, which may implement target speaker audio enhancement for transmitted audio is described. Different methods and techniques to implement the training of the machine learning model are then discussed, some of which are illustrated by an accompanying flowchart. Finally, a description of an example computing system upon which the various components, modules, systems, devices, and/or nodes may be implemented is provided. Various examples are provided throughout the specification.

FIG. 1A illustrates a logical block diagram of generating a target speaker embedding, according to some embodiments.

In some embodiments, target speaker embedding 100 may illustrate the process of generating an embedding for a given target speaker. Target speaker embedding generation 104 may be used to extract speaker information to guide an extraction of a speaker's voice, according to some embodiments. For example, target speaker embedding generation 104 may obtain an audio sample for a target speaker (e.g., User A in the example embodiments shown in FIG. 1A), such as registered audio data sample A 102, generate an embedding using a machine learning model during training, and provide speaker embedding for User A 106 in training workflow 110 for training a machine learning model for video processing. In some embodiments, speaker embedding for User A 106 may be utilized as a kind of control input to training workflow 110, as described in further detail in the description of FIG. 1B herein, in order to help guide the machine learning model towards a more accurate target speaker voice extraction (e.g., towards a closer match to a clean audio source component of a given noisy audio data sample).

In some embodiments, target speaker embedding generation may resemble a speaker embedder network. In such embodiments, the speaker embedder network may obtain a fix-sized embedding vector $x_e$, such as registered audio data sample A 102, and generate a speaker embedding $z_e$ such as speaker embedding for User A 106, using the following:

$$z_e = f_{emb}(x_e) \in \mathbb{R}^D,$$

wherein $f_{emb}$ is the speaker embedder network.

In such embodiments, the mel-spectrogram of registered audio data sample A 102 may be processed by a stack of Bidirectional Long Short-Term Memory (BLSTM) layers in order to model sequential information. The average of the hidden-state representation from the first and the last frames may then be projected to a lower dimension with a linear layer. Then, the projection output may be normalized with unit $\ell 2$ norm to obtain speaker embedding for User A 106. The embedder network may be trained with a generalized end-to-end loss (GE2E) technique, according to some embodiments.

FIG. 1B illustrates a logical block diagram of an example training workflow for training a machine learning model for voice processing of an audio enhancement system, according to some embodiments.

In some embodiments, a machine learning model, such as those described above, may be trained for a target speaker extraction model using training audio data samples and a speaker embedding generated from a registered audio data sample of the target speaker (see the description for FIG. 1A herein) during a semi-supervised training stage that may resemble training workflow 110. Training workflow 110 may include several components, including target speaker voice extraction 114, target speaker embedding generation 118, and voice representation loss function evaluation 122.

In the following paragraphs, an example workflow for training the machine learning model using User A as a representative target speaker is described. A person having ordinary skill in the art should understand that such example embodiments of training workflow 110 are meant to instruct the reader on the details of the methods and techniques described herein. In some embodiments, training workflow 110 may include additional and/or less components, and may also train using audio data samples other target speakers. In addition, registered audio data sample A 102 (introduced with regard to FIG. 1A) and training audio data sample A 112 are intended to be representative registered and training audio data samples associated with User A. Additional examples of such audio data samples associated with User A and examples associated to other potential target speakers such as User B are shown in metadata 140 with regard to FIG. 1D herein.

In some embodiments, target speaker voice extraction 114 may include a speech encoder, a masking network, and a speech decoder, such as speech encoder 130, masking network 132, and speech decoder 134 shown in target speaker voice extraction 114 in FIG. 1C. Target speaker voice extraction 114 may take a training audio data sample, such as training audio data sample A 112, and extract an estimated speaker level for the target speaker, such as estimated output audio for User A 116, from the multiple audio signals within training audio data sample A 112. In some embodiments, estimated output audio for User A 116 may be represented by estimated target signal $\hat{s}_t$, and the remaining extracted components of training audio data sample A 112 (e.g., estimated residual(s) 136) may be represented by estimated residual(s) $\hat{s}_r$.

In some embodiments, speaker embedding for User A 106, described above with regard to FIG. 1A, may additionally be used as input to target speaker voice extraction 114 in order to provide supervision (hence the name "semi-supervised" training) of the voice extraction of the target speaker. In some embodiments, speaker embedding for User A 106 may act as a type of control input to help guide target speaker voice extraction 114 toward a voice extraction of the target speaker that is closer to what the clean audio source component of the given training audio data sample for the target speaker should be by providing an embedding (e.g., speaker embedding for User A 106) of another clean audio data sample of User A (e.g., registered audio data sample A 102). More detail about target speaker voice extraction 114 may be found in the description for FIG. 1C herein.

In some embodiments, the next step in training workflow 110 may be to provide estimated output audio for User A 116 to target speaker embedding generation 118, which may resemble target speaker embedding generation 104 and the functionalities associated to target speaker embedding generation 104 described herein. Target speaker embedding generation 118 may take estimated output audio for User A 116 (e.g., estimated target signal St) and generate a target speaker embedding, such as estimated output speaker embedding for User A 120, that represents an estimated speaker level of User A within training audio data sample A 112 (e.g., $z_t = f_{emb}(\hat{s}_t)$). An embedding for estimated residual(s) 136 may similarly be generated using target speaker embedding generation 118 (e.g., $z_r = f_{emb}(\hat{s}_r)$).

In some embodiments, estimated output speaker embedding for User A 120 and speaker embedding for User A 106 may then be used as input to voice representation loss function evaluation 122. A voice representation loss function (e.g., a loss function of the speaker embedder network, $f_{emb}$, described above with regard to FIG. 1A) may be evaluated by computing the distance between speaker embedding for User A 106 and estimated output speaker embedding for User A 120. In some embodiments, voice representation loss function evaluation 122 may apply a triplet speaker representation loss function, or other loss functions that may compute said distance. As described above, speaker embedding for User A 106 provides a "semi-supervised" training of the machine learning model in order to guide the machine learning model to output a signal that may be closer to the actual target speaker's voice in the embedding space. For example, speaker embedding for User A 106, also introduced as $z_e$ with regard to FIG. 1A, may be used to compute the distance to both the generated estimated target speaker and residual(s) embeddings $z_t = f_{emb}(\hat{s}_t)$ and $z_r = f_{emb}(\hat{s}_r)$. In such embodiments, the voice representation loss function, $\mathcal{L}_{emb}(z_e, z_t, z_r)$, evaluated using voice representation loss function evaluation 122, may be written as $$\mathcal{L}_{emb}(z_e, z_t, z_r) = \max\{\|z_e - z_t\|_2 - \|z_e - z_r\|_2 + \gamma, 0\},$$

wherein $\gamma=1$ represents a margin. In some embodiments, voice representation loss function evaluation 122 may be additionally used to confirm that $z_e$ is more similar to $z_t$ than to $z_r$ as an indication that the machine learning model is converging during training.

Figure 1E:
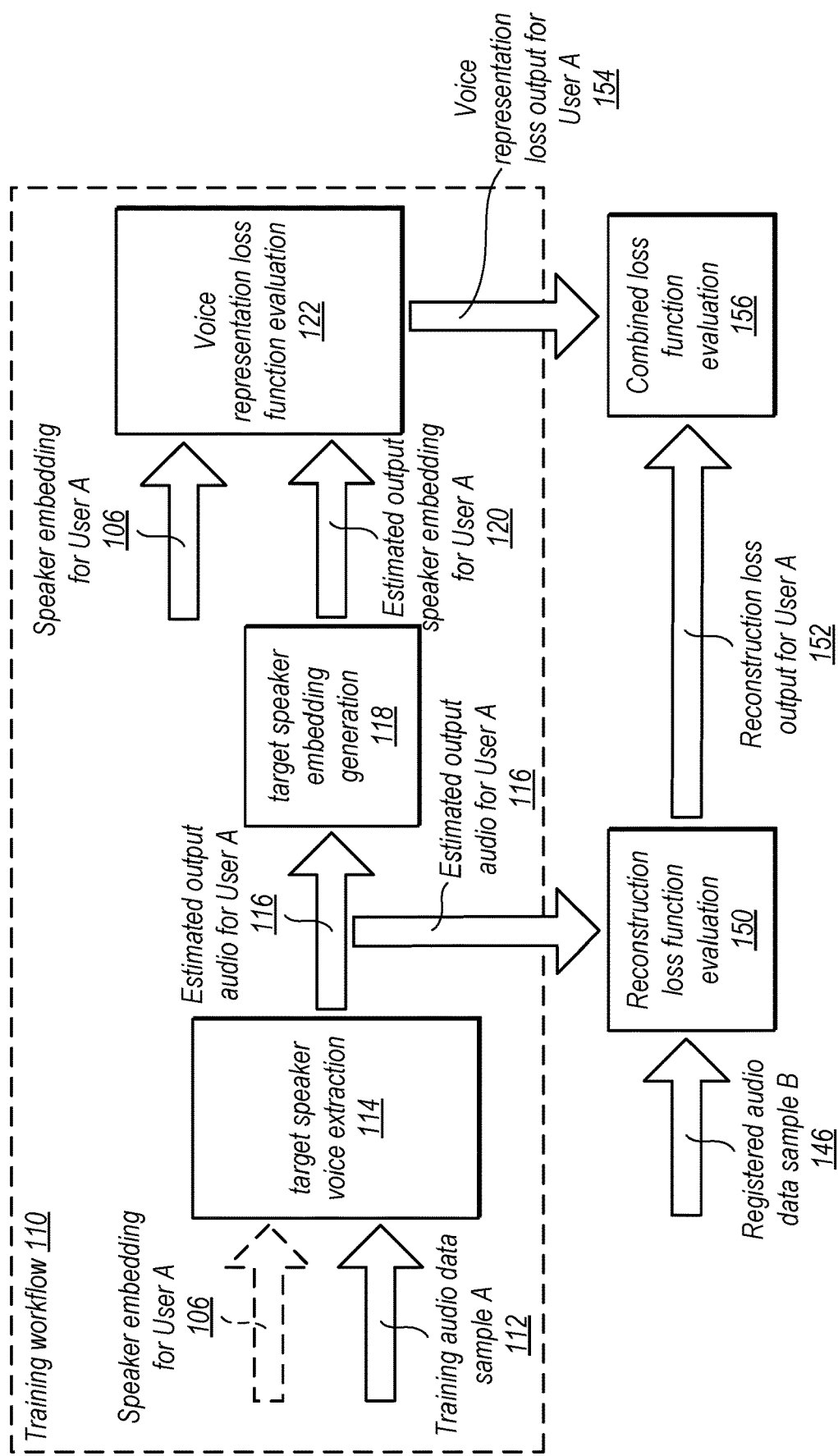
FIG. 1E illustrates a logical block diagram of a second example training workflow for training a machine learning model for voice processing of an audio enhancement system, according to some embodiments.

In some embodiments, such as those shown in FIG. 1E, the reconstruction loss function may also be evaluated in addition to $\mathcal{L}_{emb}(z_e, z_t, z_r)$ when additional registered audio data samples associated with User A are added to training workflow 110.

In some embodiments, the machine learning model may be first trained using "labeled" audio data sample mixtures during a supervised training stage, prior to training during a semi-supervised training stage described by training workflow 110. In such embodiments, at least two registered audio data samples may be synthetically mixed into a "labeled" audio data sample mixture using registered audio data samples associated with at least two different speakers. For example, referring to FIG. 1D, registered audio data sample A 102 and registered audio data sample C 144 may be synthetically mixed together to form a "labeled" audio data sample mixture associated with User A and User B. Then, a similar training workflow to training workflow 110 may be used wherein training audio data sample A 112 may be replaced by the "labeled" audio data sample mixture, and the machine learning model may be trained on User A in a supervised training stage. Supervised training is also further discussed with regard to FIG. 1E herein.

FIG. 1C illustrates a logical block diagram of an example target speaker voice extraction model for training a machine learning model for voice processing of an audio enhancement system, according to some embodiments.

In some embodiments, target speaker voice extraction 114 may represent a time domain speech separation network with speech encoder, masking network, and speech decoder components. Furthermore, the BLSTM speaker embedder network (e.g., target speaker embedding generation 104) may be used to extract speaker information and guide the target speaker voice extraction. Target speaker voice extraction 114 may be trained with a negative scale-invariant signal-to-distortion ratio (SI-SDR), and the parameters of the speaker embedder network may be fixed, according to some embodiments.

In some embodiments, speech encoder 130 may represent an encoder network consisting of a 1D convolutional layer followed by the rectifier, or ReLU (e.g., Rectified Linear Unit), activation that receives training audio data sample 112. In some embodiments in which training audio data sample 112 may be represented as a time domain input audio mixture $x \in \mathbb{R}^L$ with L samples, speech encoder 130 may transform training audio data sample 112 into a hidden representation $H \in \mathbb{R}^{F \times T}$ with F features and T temporal frames.

Masking network 132 may then take the hidden representation H as input and estimate a mask $M_c \in \mathbb{R}^{F \times T}$, $c \in \{1, 2, \ldots, C\}$, wherein C is the total number of sources in the input audio mixture. In some embodiments, masking network 132 may additionally use a generated speaker embedding, such as speaker embedding for User A 106, as input to estimate the mask. The generated speaker embedding may be represented by $z_e$, as defined above in the description for FIG. 1A herein. The masking network may include three modules in order to estimate the mask $M_c \in \mathbb{R}^{F \times T}$: segmentation, embedding-guided dual-path processing, and overlap-add, according to some embodiments.

Next, speech decoder 134 may resemble a 1D transposed convolutional layer that may transform the masked representation $H_c = M_c \odot H \in \mathbb{R}^{F \times T}$ of each source c to an estimation of the time domain signal $\hat{s}_c = \text{TransposedConv1D}(H_c) \in \mathbb{R}^L$. In such embodiments, the time domain signal $\hat{s}_c$ of the source pertaining to the target speaker may resemble estimated output audio for User A 116, and the time domain signal $\hat{s}_c$ of the source pertaining to other audio signals (e.g., additional speakers, background noise, etc.) within training audio data sample 112 may resemble estimated residual(s) 136.

FIG. 1D illustrates an example of metadata for a speaker registry of an audio enhancement system, according to some embodiments.

In some embodiments, metadata associated with a speaker registry of an audio enhancement system, such as metadata 140, may resemble the embodiments shown in FIG. 1D. Metadata 140 may include information about registered audio data samples and training audio data samples that are stored for use by the audio enhancement system. The information may include identifiers pertaining to particular audio data samples, such as the speakers that have been identified as talking during given audio data samples. The information may additionally include a time stamp pertaining to when the particular audio data sample was received to and/or used by the audio enhancement system, and/or other information that may be relevant for use by the audio enhancement system.

As shown in FIG. 1D, metadata 140 may store information about at least audio samples 102, 142, 144, 112, 146, and 148. For example, metadata 140 may include a name (e.g., title, label, etc.) of audio sample 102, such as registered audio data sample A, and may additionally include the information that User A has been identified as speaking during registered audio data sample A. In another example, metadata 140 may include a name of audio sample 112, such as training audio data sample A, and may additionally include the information that at least User A has been identified as speaking during Training audio data sample A, along with some unidentified user(s) and some background noise (e.g., interference, stochastic or otherwise, in addition to the audio of User A and the unidentified user(s)). Unidentified user(s) may refer to users who have not been registered in the speaker registry, according to some embodiments. In yet another example, metadata 140 may include the information that, for audio sample 148, or Training audio data sample C, two users of the speaker registry, User A and User B, have been identified as speaking during Training audio data sample C. In addition, audio sample 144 provides an example that a non-interfering amount of background noise is present in addition to User A in Registered audio data sample B.

In some embodiments, an evaluation may take place using metadata 140 in order to identify a match between registered audio data samples and training audio data samples that have been identified as sharing a common speaker of the speaker registry. For example, such an evaluation may identify that audio samples 102, 142, 112, and 148 contain speech of User A. In another example, such an evaluation may identify that audio samples 144, 146, and 148 contain speech of User B. Results of such evaluations may be used to train the machine learning model for the audio enhancement system, as described in at least FIGS. 1A, 1B, 1C, and 1E herein.

Figure 3:
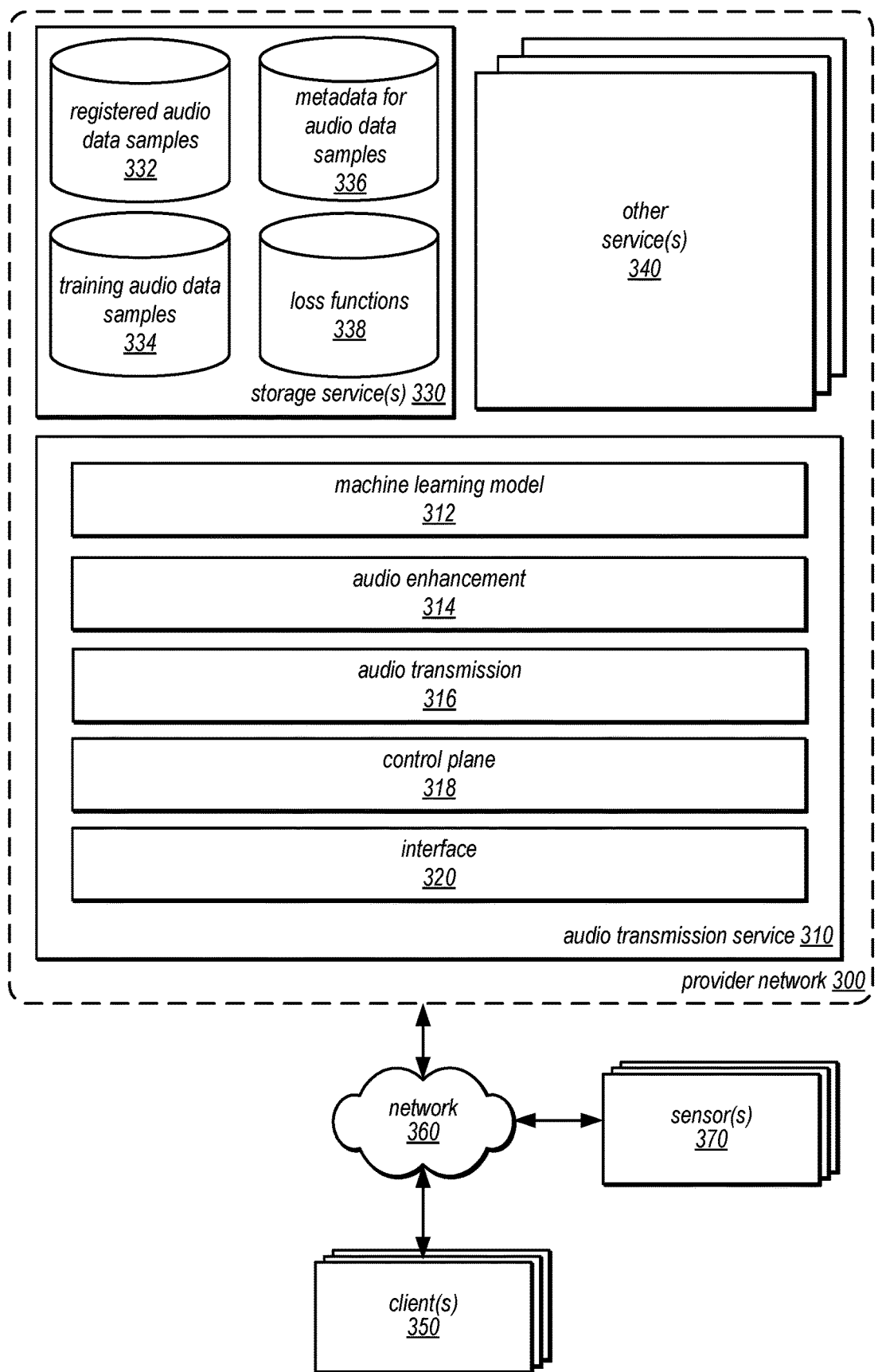
FIG. 3 illustrates an example provider network that may implement an audio transmission service for a target speaker audio enhancement system, according to some embodiments.

In some embodiments, metadata 140 may be part of a provider network, such as provider network 300 shown in FIG. 3, and may be stored in storage service(s) 330 for use by audio transmission service 310. In such embodiments, metadata 140 may resemble metadata for audio data samples 336, and may include information about registered audio data samples 332 and training audio data samples 334.

FIG. 1E illustrates a logical block diagram of a second example training workflow for training a machine learning model for voice processing of an audio enhancement system, according to some embodiments.

In some embodiments, such as those shown in FIG. 1E, a reconstruction loss function may additionally be evaluated when registered audio data samples are used in addition to the training audio data samples used in training workflow 110. As shown in FIGS. 1B and 1E, voice representation loss function evaluation 122 may be used to evaluate voice representation loss function $\mathcal{L}_{emb}$, as described above with regard to FIG. 1B. In addition, when estimated output audio for User A 116 is applied as input to reconstruction loss function evaluation 150 along with another registered audio data sample associated with User A, such as registered audio data sample B 146, reconstruction loss output for User A 152 may be computed. In some embodiments, the reconstruction loss function of reconstruction loss function evaluation 150 may be represented by $\mathcal{L}_{SI\text{-}SDR}$, wherein SI-SDR is a (negative) scale-invariant signal-to-distortion ratio.

Furthermore, voice representation loss function $\mathcal{L}_{emb}$ (e.g., voice representation loss output for User A 154) and reconstruction loss function $\mathcal{L}_{SI\text{-}SDR}$ (e.g., reconstruction loss output for User A 152) may be used to evaluate a combined loss function, $\mathcal{L}_{semi}$, using combined loss function evaluation 156, according to some embodiments. The combined loss function may represent a loss function for the semi-supervised training stage, such as $$\mathcal{L}_{semi} = \lambda_s \mathbb{1}[\{s, x, x_e\} \in \mathcal{D}_s] \cdot \frac{1}{2} \sum_{c \in \{t,r\}} \mathcal{L}_{SI\text{-}SDR}(sc, \hat{s}_c) + \lambda_u \mathcal{L}_{emb}(z_e, z_t, z_r),$$

where $\lambda_s$, $\lambda_u$ are hyperparameters controlling losses $\mathcal{L}_{ESI\text{-}SDR}$ and $\mathcal{L}_{emb}$, $\mathbb{1}$ is an indicator function, and $\mathcal{D}_s$ represents the dataset with ground-truth target speaker speech (e.g., audio data from registered audio data sample A 102 and/or registered audio data sample B 146).

As described above with regard to FIG. 1B, the machine learning model may be first trained using "labeled" audio data sample mixtures during a supervised training stage, prior to training during a semi-supervised training stage and evaluating $\mathcal{L}_{semi}$. In such embodiments, the machine learning model refines $\mathcal{L}_{SI\text{-}SDR}$ using source components of the "labeled" audio data sample mixtures during the supervised training stage. The machine learning model then further refines $\mathcal{L}_{emb}$ and/or $\mathcal{L}_{SI\text{-}SDR}$ during the semi-supervised training stage.

Figure 2:
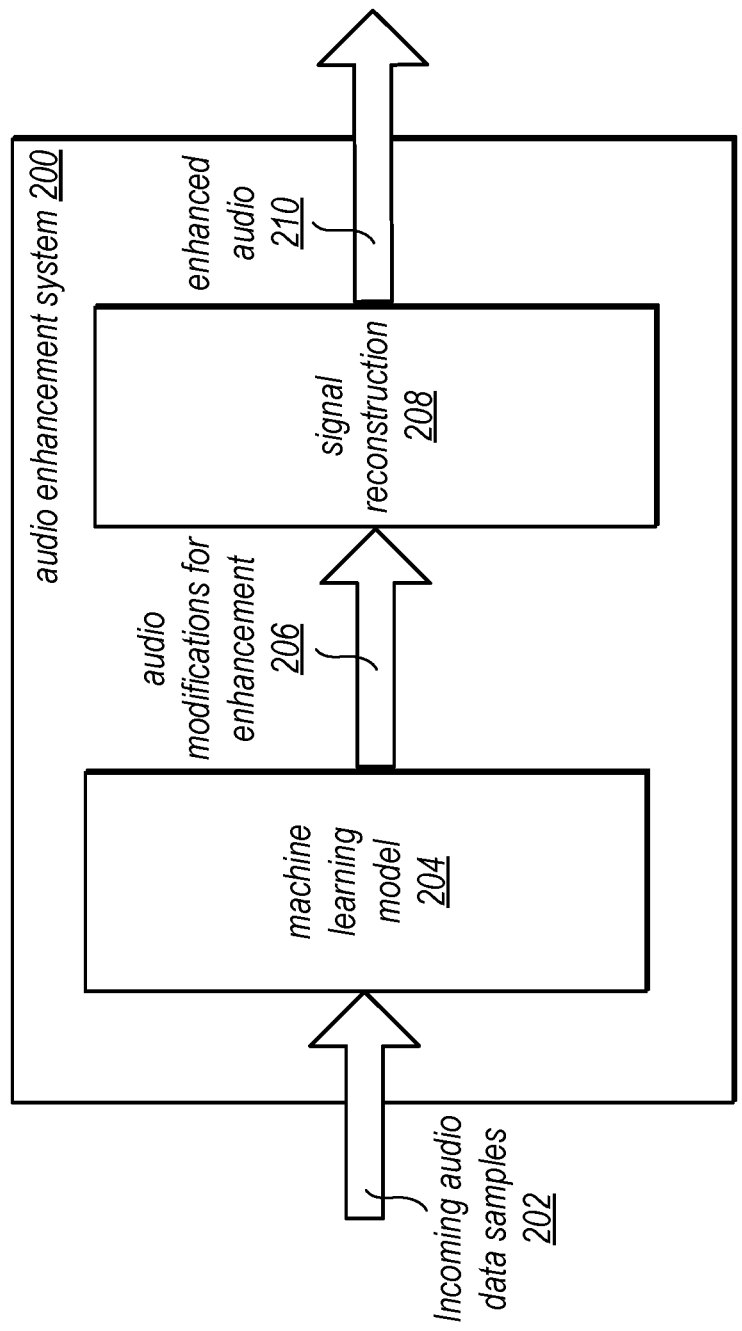
FIG. 2 illustrates a logical block diagram of a target speaker audio enhancement system, according to some embodiments.

FIG. 2 illustrates a logical block diagram of a target speaker audio enhancement system, according to some embodiments.

Audio enhancement system 200 may be implemented as part of various network-based systems, services, and/or stand-alone systems, such as audio enhancement 314 for audio transmission service 310 of provider network 300, that receive incoming audio data samples 202 (e.g., speech audio, such as the training and/or "noisy" audio data samples described herein) and provide enhanced audio 210 as output. In some embodiments, audio enhancement system 200 may be implemented "service-side," in which an audio sensor that captures the audio data (e.g., sensor(s) 370) may be separate from a service or system (e.g., provider network 300) that implements audio enhancement system 200. In such embodiments, incoming audio data samples 202 may be sent from the audio sensor (e.g., over a network connection such as network 360) to the system or service for audio enhancement. In other embodiments, audio enhancement system 200 may be implemented as part of a same device as the audio sensor (e.g., as part of an audio processing component or system implemented within a device that includes an audio sensor, such as a mobile phone or device, including various types of "smart" phones, "smart" speakers, "smart" televisions, content delivery or audio/video streaming devices that capture audio data, and so on).

In some embodiments, the machine learning model training workflows described in at least FIGS. 1A, 1B, 1C, 1D, and 1E may be used to train machine learning model 204, implemented as part of audio enhancement system 200. Machine learning model 204 may also include methods and techniques for extracting a target speaker's voice (e.g., target speaker voice extraction 114), such that audio data associated with a target speaker may be extracted from incoming audio data samples 202, according to some embodiments. In various embodiments, machine learning model 204 may be a deep learning model (e.g., deep neural network).

In some embodiments, audio modifications for enhancement 206 may include modifications (e.g., instructions) for enhancing the target speaker within the given incoming audio data samples 202, based on determinations of machine learning model 204. Such modifications may include estimated outputs of the target speaker for the respective incoming audio data samples 202 (e.g., estimated output audio for User A 116), in addition to loss functions (e.g., voice representation loss output for User A 154, reconstruction loss output for User A 152, etc.), for example.

In some embodiments, signal reconstruction 208 may be used to generate enhanced audio 210. Signal reconstruction 130 may be implemented as part of audio enhancement system 200 to reconstruct incoming audio data samples 202 into enhanced audio 210 based on any analysis and/or other filtering of the audio data described by machine learning model 204 and/or audio modifications for enhancement 206. Enhanced audio 210 may then refer to audio data that has been modified to be in some way closer to a "clean" speech audio representation of incoming audio data samples 202, according to some embodiments.

Please note that the above description of audio enhancement system 200 is a logical illustration and thus is not to be construed as limiting as to the implementation of an audio enhancement system.

FIG. 3 illustrates an example provider network that may implement an audio transmission service for a target speaker audio enhancement system, according to some embodiments.

FIG. 3 illustrates an example provider network that may implement an audio transmission service for target speaker audio enhancement, according to some embodiments. Provider network 300 may be a private or closed system or may be set up by an entity such as a company or a public sector organization to provide one or more services (such as various types of cloud-based storage) accessible via the Internet and/or other networks to clients 350, according to some embodiments. Provider network 300 may be implemented in a single location or may include numerous data centers hosting various resource pools, such as collections of physical and/or virtualized computer servers, storage devices, networking equipment and the like (e.g., computer system 600 described below with regard to FIG. 6), needed to implement and distribute the infrastructure and services offered by the provider network 300, according to some embodiments. In some embodiments, provider network 300 may implement various computing resources or services, such as audio transmission service 310, storage service(s) 330, and/or any other type of network-based services 340 (which may include a virtual compute service and various other types of storage, database or data processing, analysis, communication, event handling, visualization, data cataloging, data ingestion (e.g., ETL), and security services).

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 6, computer system 600, and described below. In various embodiments, the functionality of a given system or service component (e.g., a component of audio transmission service 310 may be implemented by a particular node or may be distributed across several nodes. In some embodiments, a given node may implement the functionality of more than one service system component (e.g., more than one data store component).

Audio transmission service 310 may implement machine learning model 312, according to some embodiments. In some embodiments, machine learning model 312 may resemble the embodiments and functionalities shown in at least FIGS. 1B, 1C, 1E, and 2 (e.g., machine learning model 204). Audio transmission service 310 may also implement audio enhancement 314 to provide audio enhancement techniques (e.g., via audio enhancement system 200) within provider network 300, according to some embodiments.

Audio transmission service 310 may implement interface 320 to allow clients (e.g., client(s) 350 or clients implemented internally within provider network 300, such as a client application hosted on another provider network service like an event driven code execution service or virtual compute service) to send audio data for enhancement, storage, and/or transmission. In some embodiments, audio transmission service 310 may also support the enhancement and/or transmission of video data along with the corresponding audio data and thus may be an audio/video enhancement and/or transmission service, which may perform the various techniques discussed above with regard to FIGS. 1A, 1B, 1C, 1D, 1E, and 2, and below with regard to FIGS. 4 and 5, for audio data captured along with video data, in some embodiments.

Figure 4:
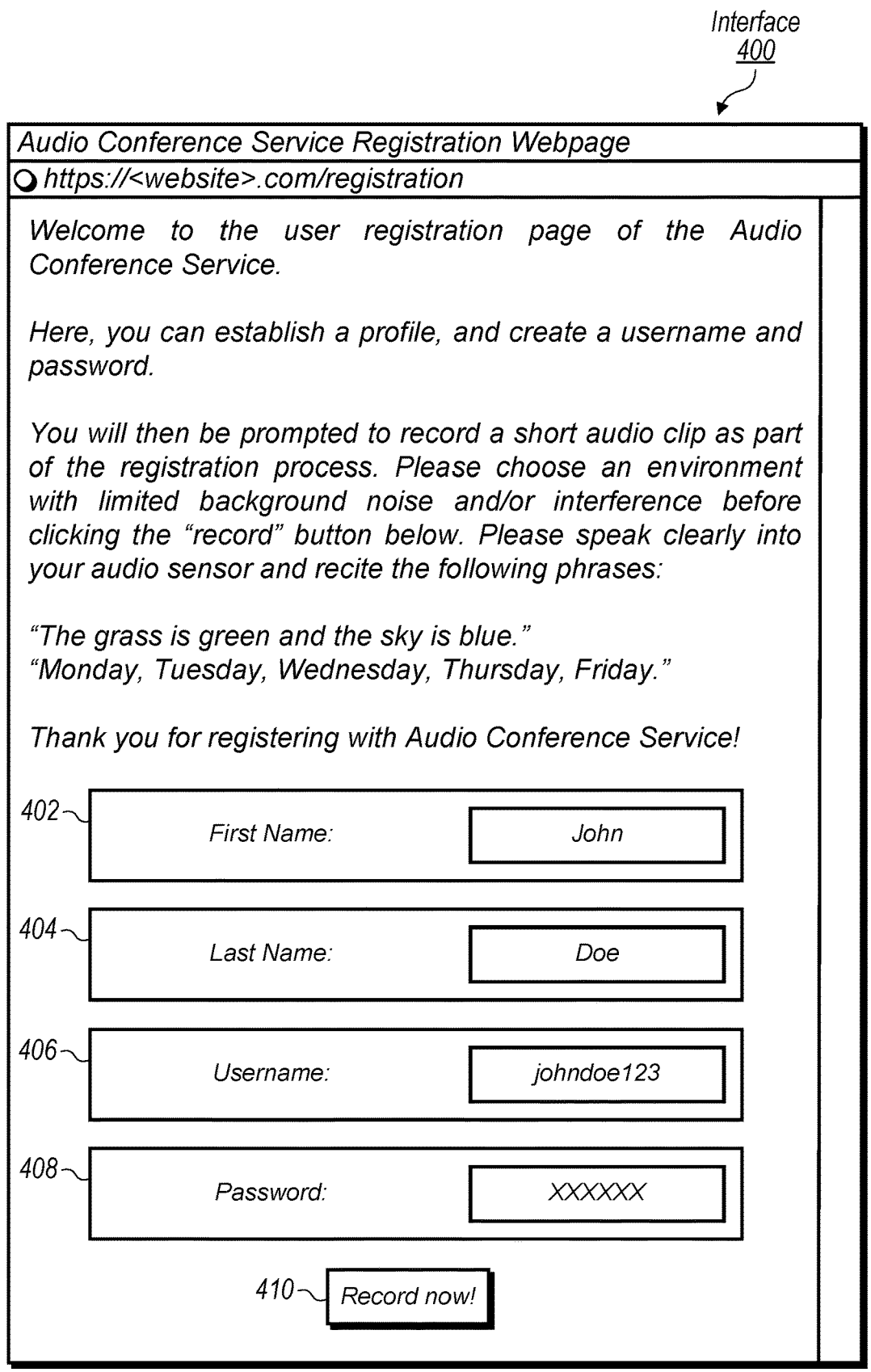
FIG. 4 illustrates an example of a web-based interface used to register new users to an audio enhancement service and to prompt the new users to make a short enrollment audio recording, according to some embodiments.

Audio transmission service 310 may implement interface 320 (e.g., a graphical user interface, programmatic interface that implements Application Program Interfaces (APIs) and/or a command line interface) such that a client application can submit an audio stream captured by sensor(s) 370 to be stored in storage service(s) 330, or other storage locations or resources within provider network 300 or external to provider network 300 (e.g., on premise data storage in private networks), as shown in some embodiments of FIG. 4, for example. Interface 320 may allow a client to cause audio enhancement using the techniques discussed herein, (e.g., as part of audio transmission, such as voice transmission like Voice over IP (VOIP)).

Audio transmission service 310 may implement a control plane 318 to perform various control operations to implement the features of audio transmission service 310. For example, control plane 318 may monitor the health and performance of requests at different components such as audio enhancement 314 and audio transmission 316 (e.g., the health or performance of various nodes implementing these features of audio transmission service 310). If a node fails, a request fails, or other interruption occurs, control plane 318 may be able to restart a job to complete a request (e.g., instead of sending a failure response to the client). In some embodiments, control plane 318 may arbitrate, balance, select, or dispatch requests to different node(s) in various embodiments. For example, control plane 318 may receive requests to/from/via interface 320, which may be a programmatic interface, and identify an available node to begin work on the request.

Audio transmission service 310 may implement audio transmission 316, which may facilitate audio communications (e.g., for audio-only, video, or other speech communications), speech commands or speech recordings, or various other audio transmissions, according to some embodiments.

Storage service(s) 330 may implement different types of data stores for storing, accessing, and managing data on behalf of clients 350 as a network-based service that enables clients 350 to operate a data storage system in a cloud or network computing environment, according to some embodiments. In some embodiments, storage service(s) 330 may also include various kinds relational or non-relational databases, and storage service(s) 330 may include object or file data stores for putting, updating, and getting data objects or files. Storage service(s) 330 may be accessed via programmatic interfaces (e.g., APIs) or graphical user interfaces.

In some embodiments, registered audio data samples 332, training audio data samples 334, metadata for audio data samples 336, and/or loss functions 338 may be stored in and/or retrieved from storage service(s) 330 for use by audio transmission service 310. In some embodiments, registered audio data samples 332 may resemble audio samples 102, 142, and 144 and their functionalities described herein, and training audio data samples 334 may resemble audio samples 112, 146, and 148 and their functionalities described herein. Furthermore, metadata for audio data samples 336 may include information about registered audio data samples 332 and training audio data samples 334 such that matches may be evaluated for given registered and training audio data samples that share a common speaker.

In some embodiments, storage service(s) may store and update loss functions within loss functions 338 during training of machine learning model 312. Such loss functions may include outputs and/or results of voice representation loss function evaluation 122, reconstruction loss function evaluation 150, and/or combined loss function evaluation 156. During the process of training machine learning model 312, an evaluated loss function stored in loss functions 338 may be removed, updated, and/or replaced by an updated evaluated loss function as the process of training continues. In some embodiments, additional registered and/or training audio data samples may be received by provider network 300 (e.g., via sensor(s) 370 and/or interface 320) and additionally stored in storage service(s) 330. In such embodiments, metadata for audio data samples 336 may be updated such that information about the additional registered and/or training audio data samples is included. In some embodiments, storage service(s) 330 may additionally store various speaker embeddings, such as speaker embedding for User A 106 and estimated output speaker embedding for User A 120.

Generally speaking, client(s) 350 may encompass any type of client that can submit network-based requests to provider network 300 via network 360, including requests for audio transmission service 310 (e.g., a request to enhance, transmit, and/or store audio data). For example, a given client of client(s) 350 may include a suitable version of a web browser, or may include a plug-in module or other type of code module that can execute as an extension to or within an execution environment provided by a web browser. Alternatively, a client(s) 350 may encompass an application (or user interface thereof), a media application, an office application or any other application that may make use of audio transmission service 310 (or other service(s) 340 of provider network 300) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client(s) 350 may be an application that can interact directly with provider network 300. In some embodiments, client(s) 350 may generate network-based services requests according to a Representational State Transfer (REST)-style network-based services architecture, a document or message-based network-based services architecture, or another suitable network-based services architecture.

In some embodiments, client(s) 350 may provide access to provider network 300 to other applications in a manner that is transparent to those applications. Client(s) 350 may convey network-based services requests (e.g., requests to interact with services like audio transmission service 310) via network 360, according to some embodiments. In various embodiments, network 360 may encompass any suitable combination of networking hardware and protocols necessary to establish network-based communications between client(s) 350 and provider network 300. For example, network 360 may generally encompass the various telecommunications networks and service providers that collectively implement the Internet. Network 360 may also include private networks such as local area networks (LANs) or wide area networks (WANs) as well as public or private wireless networks, according to some embodiments. For example, both a given client of client(s) 350 and provider network 300 may be respectively provisioned within enterprises having their own internal networks. In such embodiments, network 360 may include the hardware (e.g., modems, routers, switches, load balancers, proxy servers, etc.) and software (e.g., protocol stacks, accounting software, firewall/security software, etc.) necessary to establish a networking link between the given client of client(s) 350 and the Internet as well as between the Internet and provider network 300. It is noted that in some embodiments, client(s) 350 may communicate with provider network 300 using a private network rather than the public Internet.

Sensor(s) 370, such as microphones, may, in various embodiments, collect, capture, and/or report various kinds of audio data, (or audio data as part of other captured data like video data). Sensor(s) 370 may be implemented as part of devices, such as various mobile or other communication and/or playback devices, such as microphones embedded in "smart-speaker" or other voice command-enabled devices. In some embodiments, sensor(s) 370 may be used to capture an audio sample of a client of client(s) 350 that has registered for audio transmission service 310, such as in some embodiments of FIG. 4.

Although FIG. 3 has been described and illustrated in the context of a provider network implementing an audio transmission service, the various components illustrated and described in FIGS. 1A, 1B, 1C, 1D, 1E, 2, 4, 5, and 6 may be easily applied to other systems that implement audio enhancement.

FIG. 4 illustrates an example of a web-based interface used to register new users to an audio enhancement service and to prompt the new users to make a short enrollment audio recording, according to some embodiments.

In some embodiments, interface 320 may resemble a graphical user interface, such as a web-based graphical user interface shown by interface 400. In such embodiments, an Audio Conference Service, such as audio transmission service 310 of provider network 300, may permit users (e.g., customers, clients, etc.) to register for the Audio Conference Service.

As shown in the text of interface 400, a user may be prompted to provide their first and last names (e.g., via submission boxes 402 and 404), and to create a username and password (e.g., via submission boxes 406 and 408) in order to register to Audio Conference Service (e.g., create a profile with Audio Conference Service). A person having ordinary skill in the art should understand that submission boxes 402, 404, 406, and 408 are meant to be examples of the types of information that Audio Conference Service may collect in order to register a user to the service, and that other information, or less information, may also be included in embodiments of interface 400.

In some embodiments, a user may also be prompted to record an audio sample as part of the registration process to Audio Conference Service. As shown in the text of interface 400, the user may be prompted to record themselves speaking several short phrases (e.g., via the Record now! icon 410). However, in other embodiments, the user may be prompted to record themselves speaking other phrases than those shown by interface 400, and/or may be prompted to simply record themselves speaking for a given amount of time. The user may also be kindly reminded to speak clearly into their audio capture sensor (e.g., sensor(s) 370) and to choose an environment with limited background noise and/or interference. Such criteria are meant to enable for the audio capture of a "clean" audio sample for the user registering for Audio Conference Service. In some embodiments in which, after the user has made the audio recording, the audio recording is not determined to be a "clean" audio sample, the given audio sample may be rejected by Audio Conference Service, and the user may be prompted to re-record the audio sample. Alternatively, in some embodiments in which the user attempted to speak the phrases in a noisy environment, Audio Conference Service may store the audio sample as a training audio data sample (e.g., an audio sample identified as being both associated to the newly registered user and having at least one background noise signal), and then prompt the user to re-record themselves speaking the given phrases in a quieter environment.

In embodiments in which the audio recording prompted using the Record now! icon 410 is indeed a "clean" audio sample, the audio sample may then be stored to registered audio data samples 332. In some embodiments, upon storing the audio sample to registered audio data samples 332, this may cause metadata for audio data samples 336 to also be updated to include metadata associated with the audio sample of the newly registered user. For example, metadata 140 may be updated to include metadata such as "Audio sample: Registered audio data sample D" and "Speakers identified in the sample: John Doe." The registration of the given user to Audio Conference Service may additionally include adding the speaker to a speaker registry of registered users of Audio Conference Service (e.g., using the information gathered via submission boxes 402, 404, 406, and 408), according to some embodiments.

A person having ordinary skill in the art should understand that interface 400 is meant to be a representation of some embodiments of interface 320, and that interface 320 may also be represented by any audio prompt interface, programmatic interface that implements Application Program Interfaces (APIs), and/or a command line interface which enables client(s) 350 to send and/or submit audio data samples to provider network 300 and otherwise interact with services of provider network 300.

Figure 5:
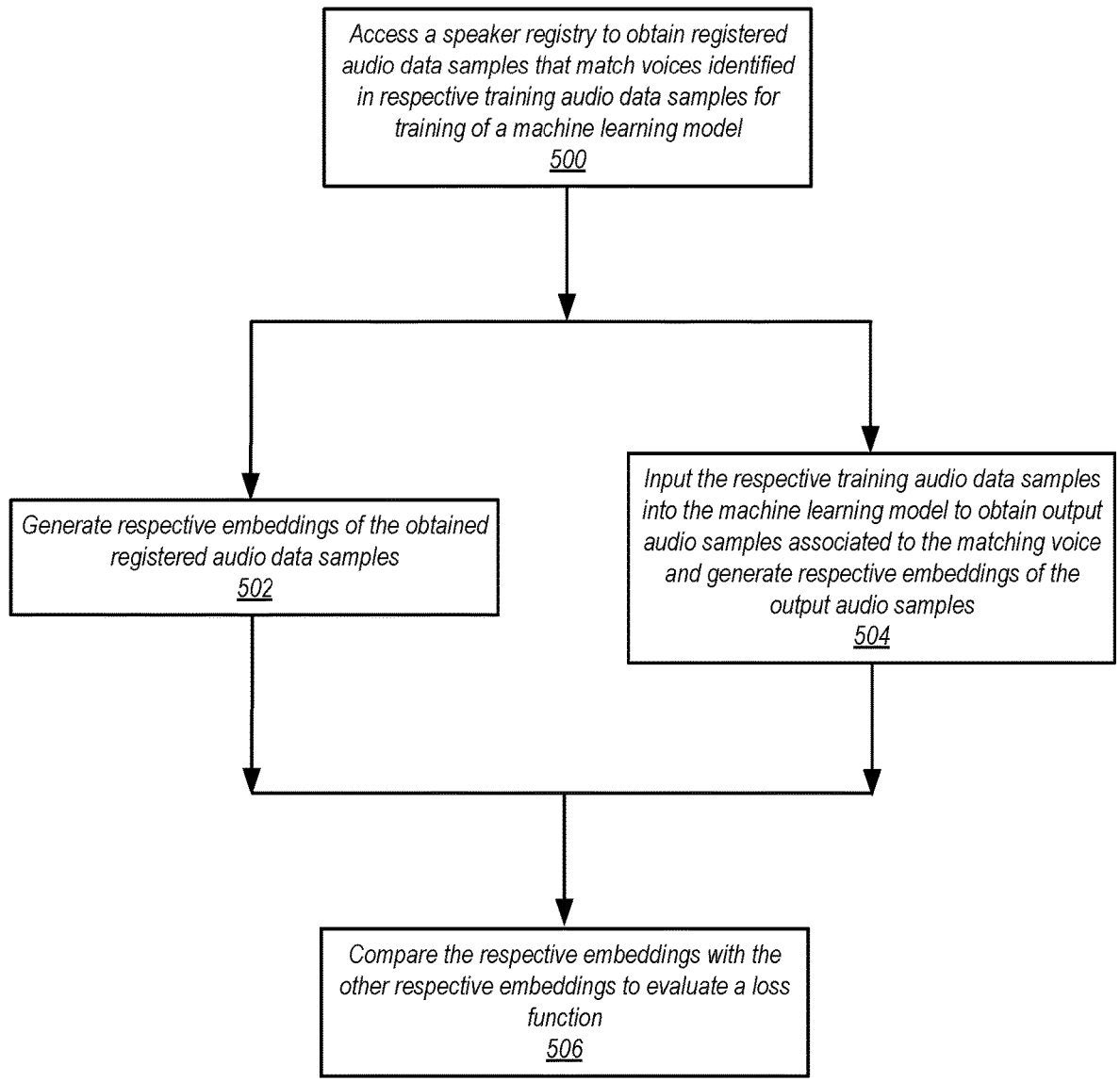
FIG. 5 illustrates a high-level flowchart of various methods and techniques to implement a training workflow for training a machine learning model for voice processing of an audio enhancement system, according to some embodiments.

FIG. 5 illustrates a high-level flowchart of various methods and techniques to implement a training workflow for training a machine learning model for voice processing of an audio enhancement system, according to some embodiments. Various different systems and devices may implement the various methods and techniques described in the following paragraphs, either singly or working together. Therefore, the above examples and or any other systems or devices referenced as performing the illustrated method are not intended to be limiting as to other different components, modules, systems, or devices.

In block 500, a speaker registry is accessed in order to obtain registered audio data samples and training audio data samples that both contain speech from a common speaker. In some embodiments, the speaker registry may refer to a list of registered users of audio transmission service 310, and the registered and training audio data samples may refer to audio data samples stored in storage service(s) 330, such as registered audio data samples 332 and training audio data samples 334, for example. In such embodiments, metadata for audio data samples 336 may be used to identify registered audio data samples and training audio data samples that are associated to a given speaker. For example, registered audio data samples 102 and 142 have a matching voice within training audio data samples 112 and 148 (e.g., speech of User A).

In block 502, respective embeddings of the obtained registered audio data samples are generated. In some embodiments, block 502 may resemble embodiments shown in target speaker embedding 100, in which registered audio data sample A 102 is used to generate speaker embedding for User A 106 via target speaker embedding generation 104. In such embodiments, the matching voice of block 500 (e.g., User A in the given example) may be considered to be the target speaker.

In block 504, the respective training audio data samples identified in block 500 are input into the machine learning model. In some embodiments, this may refer to inputting training audio data sample A 112 into training workflow 110. In such embodiments, target speaker voice extraction 114 is used to extract estimated output audio for User A 116, since, as described above, User A may be considered to be the target speaker. Also in block 504, the output audio samples associated to the matching voice are used to generate respective embeddings of the output audio samples. Continuing with the above example, this may resemble inputting estimated output audio for User A 116 into target speaker embedding generation 118 in order to generate estimated output speaker embedding for User A 120. In some embodiments, blocks 502 and 504 may occur simultaneously, sequentially, and/or in parallel.

In block 506, the respective embeddings are compared in order to evaluate a loss function. For example, speaker embedding for User A 106 and estimated output speaker embedding for User A 120 may be compared and used to evaluate a loss function, such as voice representation loss output for User A 154, via voice representation loss function evaluation 122. In some embodiments, the methods described using blocks 500, 502, 504, and 506 may be repeated in order to refine the training of the machine learning model. For example, in response to receiving new training audio data samples for User A to provider network 300, the embodiments described using blocks 500, 502, 504, and 506 may be again used to refine the training of the machine learning model on User A. In addition, blocks 500, 502, 504, and 506 may be used to train the machine learning model on other users of the speaker registry, such as User B, etc.

The methods described herein may in various embodiments be implemented by any combination of hardware and software. For example, in one embodiment, the methods may be implemented on or across one or more computer systems (e.g., a computer system as in FIG. 6) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 6:
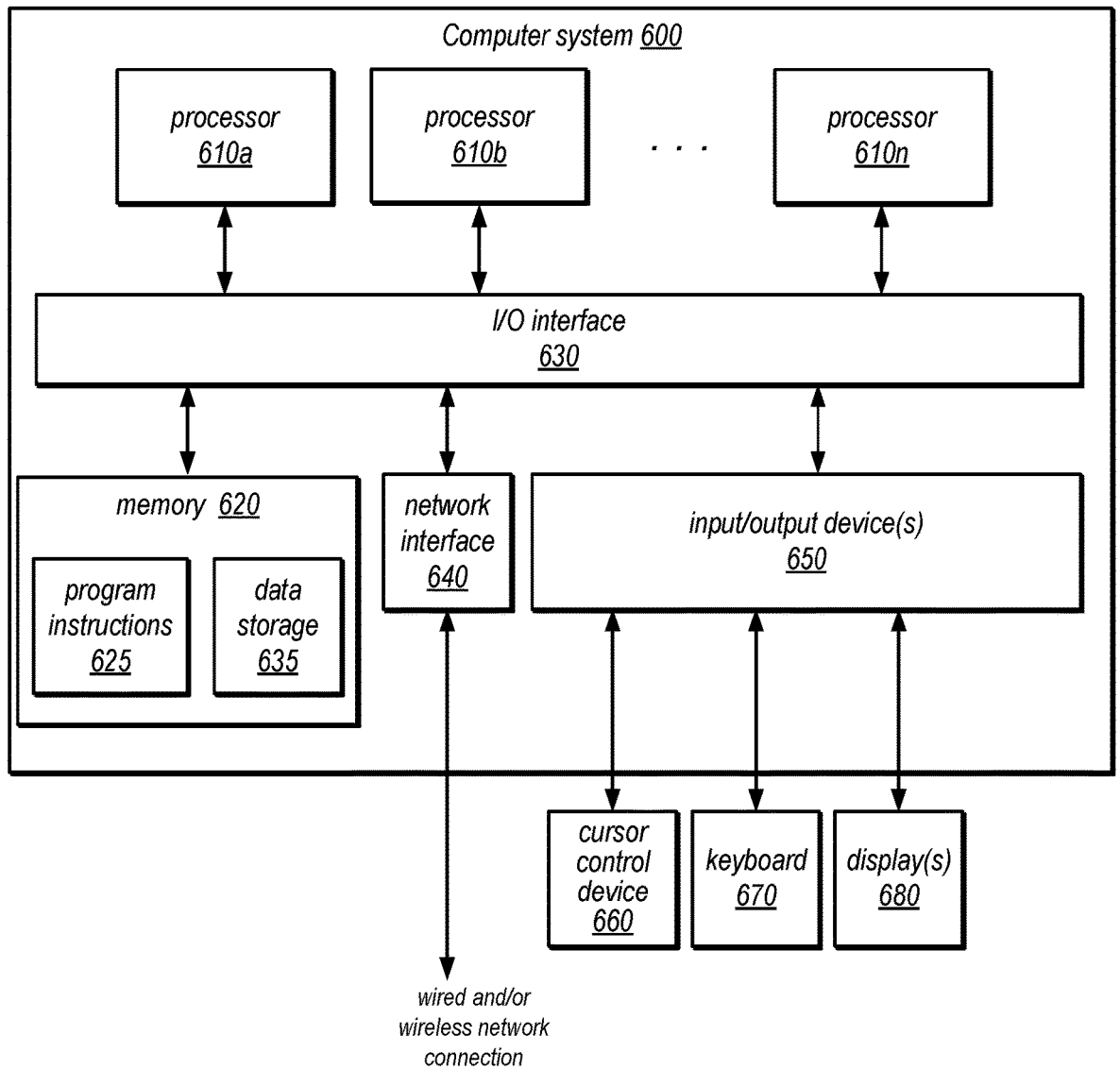
FIG. 6 illustrates an example system to implement the various methods, techniques, and systems described herein, according to some embodiments.

FIG. 6 illustrates an example system to implement the various methods, techniques, and systems described herein, according to some embodiments.

Embodiments of real-time target speaker audio enhancement as described herein may be executed on one or more computer systems, which may interact with various other devices. One such computer system is illustrated by FIG. 6. In different embodiments, computer system 600 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. Display(s) 680 may include standard computer monitor(s) and/or other display systems, technologies or devices. In at least some implementations, the input/output devices 650 may also include a touch or multi-touch enabled device such as a pad or tablet via which a user enters input via a stylus-type device and/or one or more digits. In some embodiments, it is contemplated that embodiments may be implemented using a single instance of computer system 600, while in other embodiments multiple such systems, or multiple nodes making up computer system 600, may host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 620 may store program instructions and/or data accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 620 as program instructions 625 and data storage 635, respectively. In other embodiments, program instructions and/or data may be received, sent or stored upon different types of computer-accessible media or on similar media separate from system memory 620 or computer system 600. Generally speaking, a non-transitory, computer-readable storage medium may include storage media or memory media such as magnetic or optical media, e.g., disk or CD/DVD-ROM coupled to computer system 600 via I/O interface 630. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 640.

In one embodiment, I/O interface 630 may coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. In addition, in some embodiments some or all of the functionality of I/O interface 630, such as an interface to system memory 620, may be incorporated directly into processor 610.

Network interface 640 may allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or retrieving data by one or more computer system 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

As shown in FIG. 6, memory 620 may include program instructions 625, that implement the various methods and techniques as described herein, including the application of self-supervised training for audio anomaly detection and data storage 635, comprising various data accessible by program instructions 625. In one embodiment, program instructions 625 may include software elements of embodiments as described herein and as illustrated in the Figures. Data storage 635 may include data that may be used in embodiments. In other embodiments, other or different software elements and data may be included.

Those skilled in the art will appreciate that computer system 600 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement an audio enhancement system, wherein the audio enhancement system is configured to:
      obtain audio data associated with one or more users of a plurality of users of the audio enhancement system;
      generate enhanced audio data based, at least in part, utilizing the obtained audio data and a trained machine learning model;
      provide the generated enhanced audio data; and
      wherein the trained machine learning is trained according to a training workflow that comprises:
         a training stage that:
            accesses a speaker registry for the audio enhancement system to obtain registered audio data samples that match voices identified in respective training audio data samples, wherein the audio data samples are associated with the plurality of users of the audio enhancement system;
            generates respective embeddings of the obtained registered audio data samples;
            generates other respective embeddings of output audio samples of the machine learning model with a matching voice in the respective training audio data samples input to the machine learning model; and
            compares the respective embeddings with the other respective embeddings to evaluate a loss function for training the machine learning model.

2. The system of claim 1, wherein the training workflow further comprises the training stage that:
   compares the other respective embeddings with additional registered audio data samples with the matching voice to evaluate an additional loss function for training the machine learning model.

3. The system of claim 2, wherein the training workflow further comprises the training stage that:
   compares the evaluated loss function and the additional evaluated loss function to evaluate a combined loss function.

4. The system of claim 1, wherein the training workflow further comprises:
   generates additional respective embeddings of additional output audio samples of the machine learning model with the matching voice in additional training audio data samples input to the machine learning model; and
   compares the respective embeddings with the additional respective embeddings to evaluate an updated loss function for training the machine learning model.

5. The system of claim 1, wherein the training workflow further comprises:
   store the evaluated loss function to a data storage service offered by a provider network, wherein the provider network additionally hosts the audio enhancement system.

6. The system of claim 1, wherein the audio enhancement system is implemented as part of an audio transmission service offered by a provider network.

7. A method, comprising:
   obtaining audio data associated with one or more users of a plurality of users of an audio enhancement system;

generating enhanced audio data based, at least in part, utilizing the obtained audio data and a machine learning model;

providing the generated enhanced audio data; and wherein the machine learning is trained according to a training workflow that comprises:

identifying a match between a given registered audio data sample of a plurality of registered audio data samples, stored as part of a speaker registry for the audio enhancement system, and a training audio data sample of a plurality of training audio data samples, stored for the audio enhancement system, according to an evaluation of respective metadata for the plurality of registered audio data samples and the plurality of training audio data samples that identifies respective speakers in the plurality of registered audio data samples and the plurality of training audio data samples, wherein the audio data samples are associated with the plurality of users of the audio enhancement system; and using the identified match between the given registered audio data sample and the given training audio data sample to evaluate a loss function for training the machine learning model according to:

a respective speaker embedding generated for the given registered audio data sample; and an output of the machine learning model given the given training audio data sample of the identified match as input to the machine learning model.

8. The method of claim 7, wherein the training workflow further comprises:

storing the evaluated loss function to a data storage service offered by a provider network, wherein the provider network additionally hosts the machine learning system and the audio enhancement system.

9. The method of claim 7, wherein the training workflow further comprises:

using another registered audio data sample of the respective speaker and the output of the machine learning model given the given training audio data sample of the identified match to evaluate a different loss function for the training the machine learning model.

10. The method of claim 9, wherein the training workflow further comprises:

using the evaluation of the loss function and the evaluation of the different loss function as part of evaluating a combined loss function for training the machine learning model.

11. The method of claim 7, wherein the training workflow further comprises:

mixing, synthetically, two or more registered audio data samples of the plurality of registered audio data samples into an audio mixture, wherein the two or more registered audio data samples comprise at least two different speakers of respective speakers of the speaker registry;

inputting the audio mixture to the machine learning model, wherein:

the inputting comprises, at least in part, an identification of a target speaker; and the target speaker is one of the at least two different speakers; and evaluating an additional loss function for training the machine learning model according to:

an additional speaker embedding generated using a registered audio data sample of the two or more registered audio data samples for the target speaker; and an additional output of the machine learning model given the audio mixture as input to the machine learning model.

12. The method of claim 7, wherein the training workflow further comprises:

identifying an additional match between the given registered audio data and another training audio data sample of the plurality of registered audio data samples; and using the additional identified match between the given registered audio data sample and the other training audio data sample to evaluate an updated loss function for the training the machine learning model according to:

the respective speaker embedding generated for the given registered audio data sample; and another output of the machine learning model given the other training audio data sample of the additional identified match as input to the machine learning model.

13. The method of claim 7, further comprising:

responsive to receiving one or more additional training audio data samples, in addition to the plurality of training audio data samples, to the audio enhancement system, causing further training of the machine learning system using the additional training audio data samples.

14. The method of claim 7, wherein:

the output of the machine learning model given the given training audio data sample of the identified match as input to the machine learning model has passed through a speaker extractor of the machine learning model, wherein the speaker extractor comprises a speech encoder, a masking network, and a speech decoder.

15. One or more non-transitory, computer-readable storage media, storing program instructions that when executed on or across one or more computing devices cause the one or more computing devices to implement:

obtaining audio data associated with one or more users of a plurality of users of an audio enhancement system;

generating enhanced audio data based, at least in part, utilizing the obtained audio data and a machine learning model;

providing the generated enhanced audio data; and wherein the machine learning model is trained according to a training workflow that comprises:

identifying a match between a given registered audio data sample of a plurality of registered audio data samples, stored as part of a speaker registry for the audio enhancement system, and a training audio data sample of a plurality of training audio data samples according to an evaluation of respective metadata for the plurality of registered audio data samples and the plurality of training audio data samples that identifies respective speakers in the plurality of registered audio data samples and the plurality of training audio data samples, wherein the audio data samples are associated with the plurality of users of the audio enhancement system; and using the identified match between the given registered audio data sample and the given training audio data sample to evaluate a loss function for the training the machine learning model according to:

a respective speaker embedding generated for the given registered audio data sample; and
an output of the machine learning model given the given training audio data sample of the identified match as input to the machine learning model.

16. The one or more non-transitory, computer-readable storage media of claim 15, wherein the training workflow further comprises:
identifying an additional match between the given registered audio data sample and another training audio data sample of the plurality of registered audio data samples; and
using the additional identified match between the given registered audio data sample and the other training audio data sample to evaluate an updated loss function for the training the machine learning model according to:
the respective speaker embedding generated for the given registered audio data sample; and
another output of the machine learning model given the other training audio data sample of the additional identified match as input to the machine learning model.

17. The one or more non-transitory, computer-readable storage media of claim 16, storing further instructions that when executed on or across the one or more computing devices cause the one or more computing devices to further implement:
responsive to receiving one or more additional training audio data samples, in addition to the plurality of training audio data samples, to the audio enhancement system,
causing further training of the machine learning model using the additional training audio data samples.

18. The one or more non-transitory, computer-readable storage media of claim 15, wherein the training workflow further comprises:
using another registered audio data sample of the respective speaker and the output of the machine learning model given the given training audio data sample of the identified match to evaluate a different loss function for the training the machine learning model.

19. The one or more non-transitory, computer-readable storage media of claim 15, wherein the training workflow further comprises:
mixing, synthetically, two or more registered audio data samples of the plurality of registered audio data samples into an audio mixture, wherein the two or more registered audio data samples comprise at least two different speakers of respective speakers of the speaker registry;
inputting the audio mixture to the machine learning model, wherein:
the inputting comprises, at least in part, an identification of a target speaker; and
the target speaker is one of the at least two different speakers; and
evaluating an additional loss function for the training the machine learning model according to:
an additional speaker embedding generated using a registered audio data sample of the two or more registered audio data samples for the target speaker; and
an additional output of the machine learning model given the audio mixture as input to the machine learning model.

20. The one or more non-transitory, computer-readable storage media of claim 15, storing further instructions that when executed on or across the one or more computing devices cause the one or more computing devices to further implement:
a speaker extractor of the machine learning model, wherein the speaker extractor comprises a speech encoder, a masking network, and a speech decoder.

* * * * *